United States Patent [19]

Burns et al.

[11] Patent Number: 5,079,086
[45] Date of Patent: Jan. 7, 1992

[54] MAGNETIC RECORDING MEDIA

[75] Inventors: John M. Burns, Menlo Park; Walter Crooks, Los Gatos; Wai C. Leung; Randall G. Simmons, both of San Jose; Clinton D. Snyder, Los Gatos, all of Calif.

[73] Assignee: International Business Machines Corp., Armonk, N.Y.

[21] Appl. No.: 596,118

[22] Filed: Oct. 11, 1990

[51] Int. Cl.$^5$ ............................................. G11B 23/00
[52] U.S. Cl. .................................. 428/329; 428/694; 428/900
[58] Field of Search .................. 428/694, 900, 329

[56] References Cited

U.S. PATENT DOCUMENTS

| | | | |
|---|---|---|---|
| 4,540,627 | 9/1985 | Ishizawa et al. | 428/328 |
| 4,645,611 | 2/1987 | Campbell et al. | 252/62.51 |
| 4,707,410 | 11/1987 | Hata et al. | 428/413 |
| 4,719,121 | 1/1988 | Kimball | 427/48 |
| 4,731,292 | 3/1988 | Saski et al. | 428/425.9 |
| 4,761,338 | 8/1988 | Asano et al. | 428/425.9 |
| 4,784,914 | 11/1988 | Matsufugi et al. | 428/694 |
| 4,900,631 | 2/1990 | Yamakawa et al. | 428/694 |
| 5,006,406 | 4/1991 | Kovacs et al. | 428/694 |

Primary Examiner—Paul J. Thibodeau
Attorney, Agent, or Firm—Joseph G. Walsh

[57] ABSTRACT

The magnetic recording layer of a recording medium contains a film-forming resin, magnetic particles, poly(ethyleneimine), and an amionic surfactant.

8 Claims, No Drawings

MAGNETIC RECORDING MEDIA

TECHNICAL FIELD

The present invention relates to magnetic recording media, including disks and tapes, which are useful in computer, video and audio applications.

BACKGROUND ART

The prior art contains a very large number of teachings regarding magnetic recording media. The following United States patents are illustrative examples of that art. While they all bear some superficial resemblance to the present invention, they are all obviously different from the present invention.

U.S. Pat. No. 4,540,627 shows the use of phosphate compounds in a magnetic recording medium.

U.S. Pat. No. 4,645,611 shows a magnetic recording medium containing poly(ethyleneimine) structurally modified to contain at least two poly(carbonylalkyleneoxy) chains.

U.S. Pat. No. 4,707,410 shows a magnetic recording medium which contains a phosphoric acid ester compound and an epoxy group containing vinyl chloride resin.

U.S. Pat. No. 4,719,121 shows a magnetic recording medium containing the reaction product of a phosphate ester and a silicon compound.

U.S. Pat. No. 4,731,292 discloses a magnetic recording medium having a binder resin comprising a monomer unit of vinyl chloride.

U.S. Pat. No. 4,761,338 deals with a magnetic recording medium containing a polycarbonate polyurethane.

DISCLOSURE OF THE INVENTION

The present invention provides an improved magnetic recording medium characterized by increased lubricant retention, increased shelf-life, increased particle dispersion, and improved magnetic and wear properties.

According to the present invention, magnetic recording media are made having a support and a magnetic recording layer which comprises a film forming resin, magnetic particles, poly(ethyleneimine) (PEI), and an anionic surfactant. It has now unexpectedly been found that the use of poly(ethyleneimine) and an anionic surfactant together produces a synergistic improvement in the properties listed above.

Poly(ethyleneimine) (PEI) is a commercially available material. For use in the present invention, it is preferred that the average molecular weight of the material be at least 300. The commercially available materials range in molecular weight from about 300 to about 1800, identified by the names PEI-3, PEI-6, PEI-12 and PEI-18. It is likewise preferred that the average molecular weight of the anionic surfactant be at least 300. The most preferred anionic surfactants are the commercially available free acids of organic phosphate esters such as GAFAC RE-610 and GAFAC RE-510. (GAFAC is a trademark of the GAF Corporation).

Typically the most preferred amount of poly(ethyleneimine) is from about 0.5 to about 15 wt % based on the weight of the magnetic particles. The most preferred amount of the anionic surfactant is from about 0.1 to about 10 wt % based on the weight of the non-magnetic particles in the magnetic recording layer. It is to be understood that the present invention may, when so desired, be varied by including various organic binders such as epoxyphenolics, polyurethanes and others, various magnetic particles such as iron oxide, cobalt modified iron oxide, metal, barium ferrite and others, and various non-magnetic particles such as alumina, silica, carbon black and others. The use of such additional additives is quite conventional in the art. The use of a film-forming resin is also conventional.

The support may be of any of the conventionally used materials. For tapes and floppy disks, for example, various polymers such as poly(ethyleneterephthalate) may be used. For hard disks, generally metals such as aluminum or glass are used. The support, of course, should be non-magnetic.

The most preferred magnetic particles are those of gamma iron oxide. In a very desirable variation of the present invention, the coating properties of the recording medium are greatly improved by treating the gamma iron oxide particles so that the surface of the particles has been rendered basic. This is done by treating the particles with a relatively high boiling point liquid amine, preferably diethylene triamine, priortto or at the same time as the surfactant addition. Morphaline or pyrrolidine may also be used. The treatment with the liquid amine promotes dispersion, deters flocculation and provides added stability, continuity and uniformity to the magnetic recording coating layer. The treatment of the magnetic particles is conveniently done by ball or sand-milling the particles and the liquid amine for a period of a fortnight or so. High energy mills such as the Netzsch-John sand mill can be used with correspondingly shorter milling times. The overall method of coating preparation follows procedures well known in the art.

EXAMPLE

An example of a magnetic coating composition of the present invention is given in Table 1. There are no apparent flocculates or agglomerates after let-down in the magnetic medium pre-dispersed with PEI-12 and GAFAC RE-610. The magnetic coating is uniform and homogeneous and readily filters. In contrast, the magnetic media pre-dispersed with only GAFAC RE-610 or GAFAC RE-610 and poly(vinylmethylether) shows significant flocculation, agglomeration and poor filterability after let-down, as well as thickness variation after application. The particles in the medium with PEI-12 and GAFAC RE-610 are well-dispersed and appear as singlets by scanning electron microscopy compared to the aggregated structure of the particles in the media with only GAFAC RE-610 or GAFAC RE-610 and poly(vinylmethylether) (PVME).

TABLE 1

| Example 1 - Magnetic Coating Formulation | |
|---|---|
| MATERIAL | WEIGHT |
| PEI-12 (polethyleneimine) | 18.7 gr |
| GAFAC-RE-610 (phosphoric acid ester) | 18.7 gr |
| GE Epon 1009 F resin (epoxy resin) | 121.4 gr |
| Methylon 75108 (phenolic resin) | 50.6 gr |
| Gamma iron oxide particles | 500.0 gr |
| Alumina | 30.0 gr |
| Xylene | 405.3 gr |
| Isophorone | 918.5 gr |
| Ethylamylketone | 405.3 gr |
| PA 57 flow agent (silicone oil) | 2.4 gr |

For an equivalent crosslink density in the polymer (as measured by Tg), the magnetic medium prepared with a combination of PEI-12 and RE-610 showed a 1.56X increase in wear life and a sharper failure distribution compared to the magnetic medium prepared with only RE-610. Furthermore, there is a substantial increase in lubricant retention of 75% for the present invention.

TABLE 2

| Comparative Physical Data[(1),(2)] | | |
|---|---|---|
| Chemical Additive | PEI-12 and RE-610 | RE-610 |
| Magnetic PVC, % | 39.1 | 40.3 |
| Tg, °C. | 168 | 167 |
| Lube Wt., mg | 23.4 (0.8) | 13.4 (0.5) |
| LAWT, kcycles | 37.8 (12.7) | 24.3 (7.6) |

[(1)]Magnetic PVC was measured using standard TGA methods and Tg was measured using standard DMA techniques.
[(2)]LAWT was measured at 55° C. and lube weight was determined using an extraction/gravimetric method.

There is an increase in AC and DC SNR (Signal-to-Noise Ratio) of 1.6 to 3.7 dB and in modulation SNR of 2.8 to 7.6 dB for the medium prepared with PEI-12 and RE-610 compared to the media prepared with only RE-610 or RE-610 and PVME. Noise measurements were measured using an inductive thin-film head. SNR are the average of ID, MD and OD measurements.

The magnetic medium prepared with a combination of PEI-12 and RE-610 showed long shelf-life. The particles remained well-dispersed and the magnetic coating was completely uniform and homogeneous over an 11 day period. The magnetic orientation ratio measured after constant application conditions remained constant at about 2.1, showing that the coating had not flocculated after 264 hours.

It is thus seen that the present invention provides the following advantages:
1. Increases particle dispersion in a magnetic recording coating to provide a uniform, homogeneous and continuous magnetic recording layer.
2. Increases the lubricant retention of the particulate magnetic medium leading to an increase in the wear life.
3. Increases magnetic coating shelf-life (negligible time-dependent storage effects on dispersion quality, spin-coating properties and magnetic and wear performance).
4. Improves filtration of the magnetic coating (negligible change in pressure and flow rate through a 1.2 u absolute-filter with no PVC loss).
5. The magnetic recording and wear properties of the particulate magnetic medium are improved.

What is claimed is:
1. A magnetic recording medium comprising a non-magnetic support and a magnetic recording layer on said support, said magnetic recording layer comprising a film forming resin, magnetic particles, poly(ethyleneimine), in an amount from about 0.5 to about 15 wt % based on the weight of the magnetic particles, and an anionic surfactant in an amount from about 0.1 to about 10 wt % based on the weight of the non-magnetic material in the recording medium.
2. A magnetic recording medium as claimed in claim 1 wherein the magnetic particles comprise gamma iron oxide.
3. A magnetic recording medium as claimed in claim 2 wherein the surface of the gamma iron oxide particles has been rendered basic by treatment with a liquid amine.
4. A magnetic recording medium as claimed in claim 3 wherein the liquid amine is diethylene triamine.
5. A magnetic recording medium as claimed in claim 1 wherein the anionic surfactant is a phosphate ester.
6. A magnetic recording medium comprising a support and a magnetic recording layer on said support, said magnetic recording layer comprising a film forming resin, gamma iron oxide magnetic particles, poly(ethyleneimine) in an amount from about 0.5 to about 15 wt % based on the weight of the magnetic particles, and a phosphate ester surfactant in an amount from about 0.1 to about 10 wt % based on the weight of the non-magnetic material in the recording medium.
7. A magnetic recording medium as claimed in claim 6 wherein the surface of the gamma iron oxide magnetic particles has been rendered basic by treatment with a basic amine.
8. A magnetic recording medium as claimed in claim 7 wherein the basic amine is diethylenetriamine.

* * * * *